US011151705B2

(12) United States Patent
Ikeda (10) Patent No.: US 11,151,705 B2
(45) Date of Patent: Oct. 19, 2021

(54) IMAGE INSPECTING APPARATUS AND IMAGE FORMING SYSTEM

(71) Applicant: KONICA MINOLTA, INC., Tokyo (JP)

(72) Inventor: Makoto Ikeda, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/776,471

(22) Filed: Jan. 29, 2020

(65) Prior Publication Data

US 2020/0286218 A1    Sep. 10, 2020

(30) Foreign Application Priority Data

Mar. 7, 2019  (JP) .............................. JP2019-041474

(51) Int. Cl.
*G06T 7/00* (2017.01)
*G06T 7/136* (2017.01)

(52) U.S. Cl.
CPC ............ *G06T 7/0002* (2013.01); *G06T 7/136* (2017.01); *G06T 2207/10008* (2013.01); *G06T 2207/30168* (2013.01)

(58) Field of Classification Search
CPC ........... G06K 15/1822; G06K 15/1877; G06K 9/346; G06T 2207/10008; G06T 2207/30144; G06T 7/0002; G06T 7/0004; G06T 7/136
See application file for complete search history.

(56) References Cited

U.S. PATENT DOCUMENTS 9,202,147 B2    12/2015  Kawabe et al.
2009/0003700 A1*  1/2009  Xiao ...................... G06K 9/346
                                                        382/176

(Continued)

FOREIGN PATENT DOCUMENTS

JP        2017003274 A     1/2017

OTHER PUBLICATIONS

How-Lung Eng and Kai-Kuang Ma, "Noise adaptive soft-switching median filter," in IEEE Transactions on Image Processing, vol. 10, No. 2, pp. 242-251, Feb. 2001, doi: 10.1109/83.902289. (Year: 2001).*

(Continued)

*Primary Examiner* — Li Liu
(74) *Attorney, Agent, or Firm* — Holtz, Holtz & Volek PC (57) ABSTRACT

An image inspecting apparatus includes a reader that reads an image on a recording material formed in an image forming apparatus and generates read image data and an image analyzer that performs analysis to determine abnormality for the read image data by using a threshold value and creates an analysis result. The image analyzer makes pixels constituting the read image data a target pixel sequentially and performs determination of abnormality for the target pixel by using the threshold value calculated by using a threshold value calculating method. The threshold value calculating method includes a plurality of threshold value calculating methods, and a first threshold value calculating method is switched to other threshold value calculating method correspondingly to a number of pixels included in a region for calculating a threshold value.

12 Claims, 8 Drawing Sheets

(56) References Cited

U.S. PATENT DOCUMENTS

2018/0150010 A1* 5/2018 Sone .................. G03G 15/1655
2020/0204705 A1* 6/2020 Hashioka ........... H04N 1/40062

OTHER PUBLICATIONS

Wellner, Pierre D. "Adaptive thresholding for the DigitalDesk." Xerox, EPC1993-110 (1993): 1-19. (Year: 1993).*

P. D. Ingle and P. Kaur, "Adaptive thresholding to robust image binarization for degraded document images," 2017 1st International Conference on Intelligent Systems and Information Management (ICISIM), Aurangabad, India, 2017, pp. 189-193, doi: 10.1109/ICISIM.2017.8122172. (Year: 2017).*

Aslam, Yasir, et al. "An Effective Surface Defect Detection Method Using Adaptive Thresholding Fused With PSO Algorithm." International Journal of Simulation-Systems, Science & Technology 19.6 (2018). (Year: 2018).*

* cited by examiner

IMAGE INSPECTING APPARATUS AND IMAGE FORMING SYSTEM

CROSS-REFERENCE TO RELATED APPLICATION

The entire disclosure of Japanese patent application No. 2019-041474, filed on Mar. 7, 2019, is incorporated herein by reference in its entirety.

BACKGROUND

1. Technological Field

The present invention relates to an image inspecting apparatus and an image forming system.

2. Description of the Related Arts

Conventionally, image inspecting apparatuses that detect abnormalities of an inspection target surface from a captured image of the inspection target surface, have been known.

In the image inspecting apparatus disclosed in Patent Literature 1 (JP2017-003274), in order to detect abnormalities, on the basis of the brightness values of a plurality of mutually adjacent pixels including a target pixel, a plurality of representative values of respective pixels around the target image on the inspection target surface, are calculated by a plurality of spatial filters. Successively, an abnormal portion in the image is detected on the basis of the plurality of representative values.

SUMMARY

However, in the image inspecting apparatus of the Patent Literature 1, a plurality of representative values is calculated by a plurality of predetermined spatial filters. Accordingly, depending on images, there is a risk of detecting an abnormal part by using an inappropriate representative value.

The present invention has been achieved in view of the above-mentioned circumstances, and an object of the present invention is to provide an image inspecting apparatus that can detect abnormalities appropriately on the basis of a threshold value set up according to conditions.

In order to realize the above-mentioned object, an image inspecting apparatus that reflects one aspect of the present invention, includes an acquirer that acquires read image data generated by reading an image formed on a recording material by an image forming apparatus, and an image analyzer that performs analysis to determine abnormality for the read image data by using a threshold value and creates an analysis result. The image analyzer makes each of pixels constituting the read image data a target pixel sequentially and performs determination of abnormality for the target pixel by using the threshold value calculated by using a threshold value calculating method. The threshold value calculating method includes a plurality of threshold value calculating methods, and a first threshold value calculating method is switched to other threshold value calculating method correspondingly to a number of pixels included in a region for calculating a threshold value in the first threshold value calculating method.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, with reference to attached drawings, embodiments of the present invention will be described in detail. In this connection, in the description for the drawings, the same constitutional element is provided with the same reference symbol, and the overlapping description is omitted. Moreover, dimensional ratios in the drawings are exaggerated on account of description, and, may be different from the actual ratios.

Figure 1:
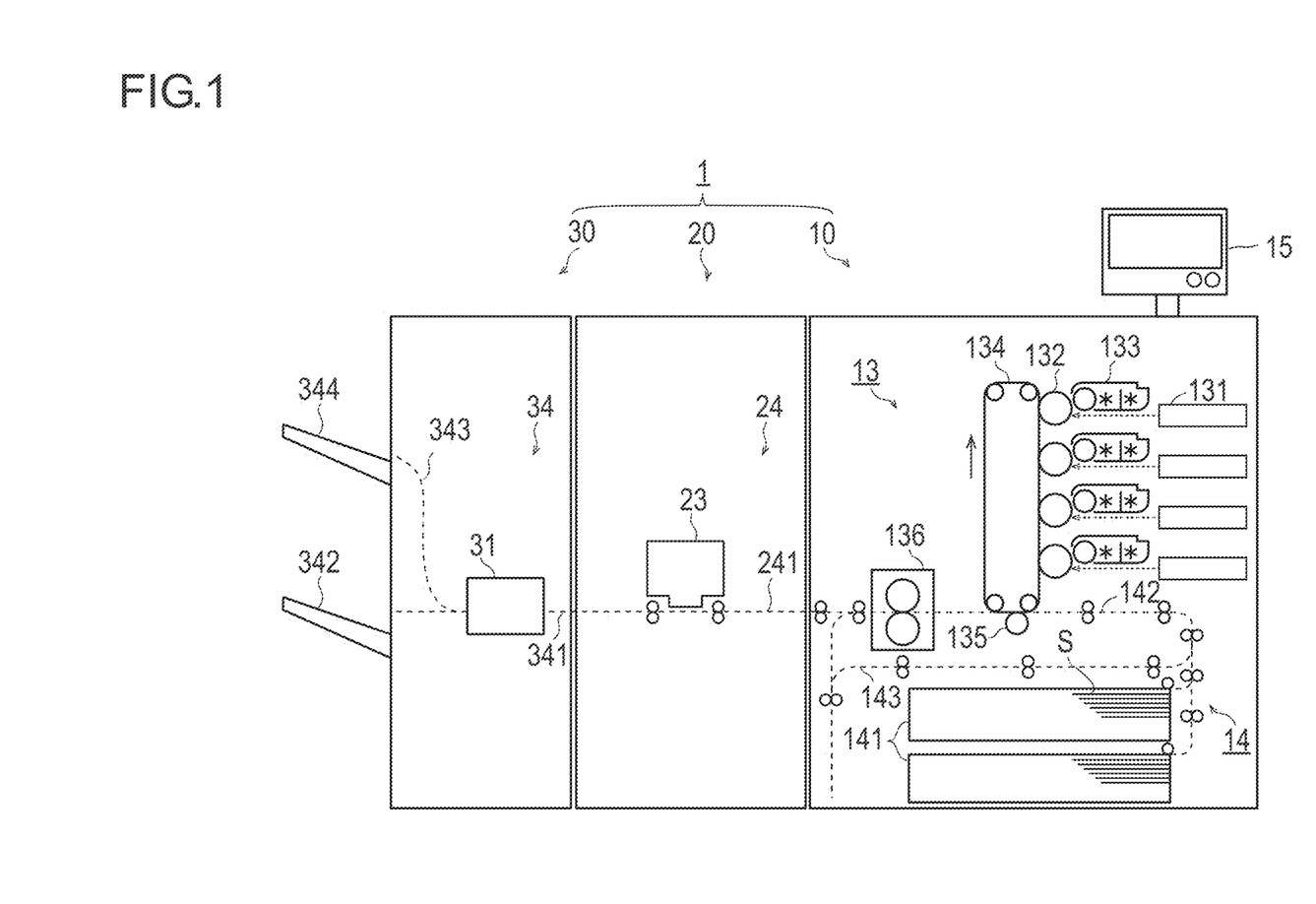
FIG. 1 is a sectional view showing a schematic structure of an image forming system according to one embodiment of the present invention.
Figure 2:
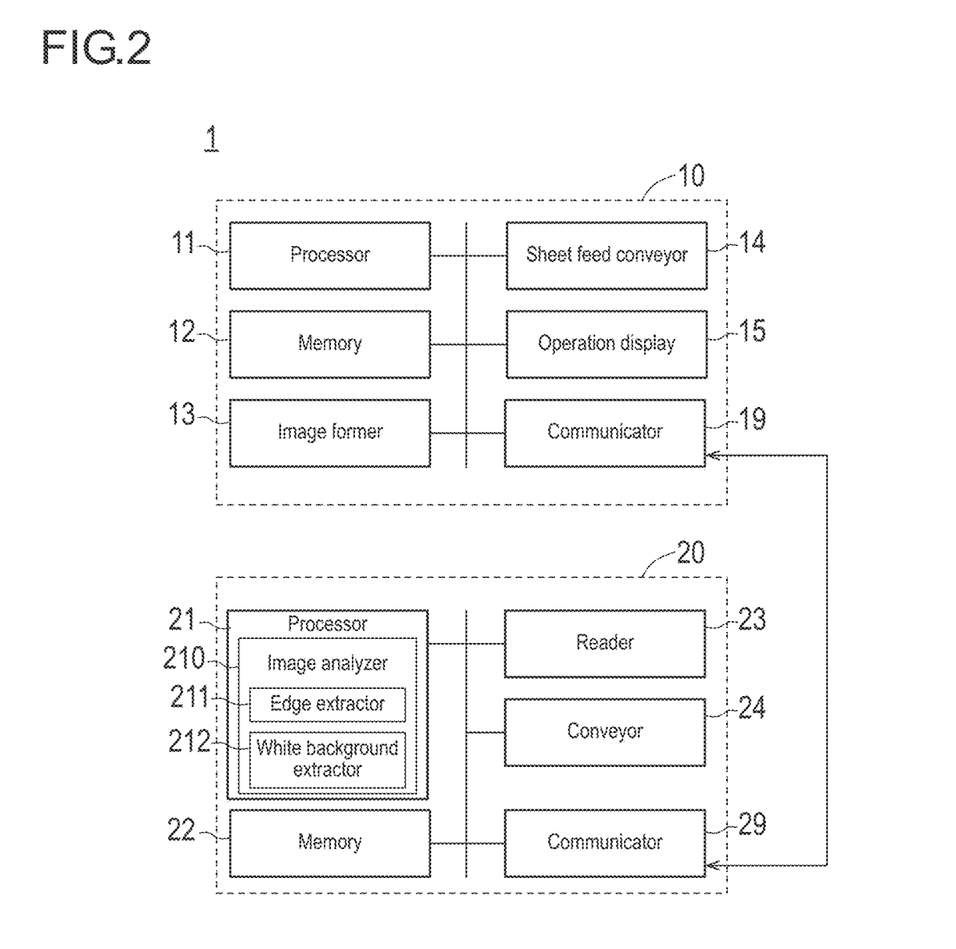
FIG. 2 is a block diagram showing a hardware configuration of the image forming system.

FIG. 1 is a drawing showing a schematic configuration of an image forming system according to one embodiment of the present invention. FIG. 2 is a block diagram showing a hardware configuration of the image forming system.

AS shown in FIGS. 1 and 2, an image forming system 1 includes an image forming apparatus 10, an image inspecting apparatus 20, and a post processing apparatus 30. The image forming apparatus 10 forms images on sheets S (recording material) on the basis of printing data. The image inspecting apparatus 20 includes a reader 23, reads an image on a sheet S printed by the image forming apparatus 10, and generates read image data. Moreover, the image inspecting apparatus 20 performs inspection for an image density, color, and an image formation position on the basis of the generated read image data, thereby detecting abnormalities and performing various kinds of image adjustments, such as density adjustment, color adjustment, and position deviation adjustment. The post processing apparatus 30 performs various kinds of post-processing for sheets printed by the image forming apparatus 10. In this connection, in the following embodiment, as shown in FIG. 1, although the image inspecting apparatus 20 is described as being a separate configuration connected to the image forming apparatus 10, the image inspecting apparatus 20 may share a housing with the image forming apparatus 10 and may be configured as one body.

(Image Forming Apparatus 10)

As shown in FIG. 2, the image forming apparatus 10 includes a processor 11, a memory 12, an image former 13, a sheet feed conveyor 14, an operation display 15, and a communicator 19, and these components are mutually connected through a bus for exchanging signals.

(Processor 11, Memory 12)

The processor 11 is a CPU and performs control for each part of an apparatus and various kinds of arithmetic processing in accordance with a program. The memory 12 includes a ROM that stores various programs and the various kinds of data beforehand, a RAM that memorizes a program and data temporarily as a workspace, a hard disk that stores various programs and various kinds of data, and the like.

(Image Former 13)

The image former 13 forms an image, for example, by an electrophotography system and includes writers 131 and image formation parts corresponding to respective basic colors (YMCK). Each image formation part includes a photoconductor drum 132, a charging electrode (not shown), a development part 133 that stores a two-component developer composed of toner and carrier, and a cleaner (not shown). Toner images formed by the respective image formation parts corresponding to the basic colors (YMCK) are superimposed on each other on an intermediate transfer belt 134 and are transferred onto a conveyed sheet S in a secondary transferer 135. The toner images (of full color) on the sheet S are fixed on the sheet S by being heated and pressurized by a fixer 136 on the downstream side.

(Sheet Feed Conveyor 14)

The sheet feed conveyor 14 includes a plurality of sheet feed trays 141, conveyance paths 142 and 143, a plurality of conveying rollers disposed on these conveyance paths 142 and 143, and a drive motor (not shown) that drives these conveying rollers. A sheet S fed out from the sheet feed tray 141 is conveyed on the conveyance path 142, subjected to image formation in the image former 13, and, thereafter, sent to the image inspecting apparatus 20 on the downstream side.

Moreover, in the case where the printing setting of a print job is the setting of double-side printing, a sheet S that has been subjected to image formation on its one side surface (first surface), is conveyed to an ADU conveyance path 143 disposed at a lower part of the image forming apparatus 10. The sheet S conveyed to this ADU conveyance path 143 is turned upside down on a switchback path, thereafter, joins the conveyance path 142, and is subjected again to image formation on the other side (second side) of the sheet S in the image former 13.

(Operation Display 15)

The operation display 15 includes a touch panel, a ten key, a start button, a stop button, and the like, displays a state of the image forming system 1, and is used for various kinds of setting and the input of an instruction by a user. Moreover, the operation display 15 receives the execution instruction of below-mentioned color adjustment and image position adjustment by a user. Moreover, in the case where abnormalities have been determined in inspection by the image inspecting apparatus 20, the operation display 15 displays an analysis result.

(Communicator 19)

The communicator 19 is an interface for the image forming apparatus 10 to communicate with the image inspecting apparatus 20, the post processing apparatus 30, and external devices, such as a PC. The communicator 19 transmits and receives various setting values, various kinds of information required for an operation timing control, and the like between itself and the image inspecting apparatuses 20. In the communicator 19, various local connecting interfaces, such as network interfaces based on standards, such as SATA, PCI, USB, Ethernet (registered trademark), and IEEE1394 and wireless communication interfaces, such as a such as Bluetooth (registered trademark) and IEEE802.11, are used.

(Image Inspecting Apparatus 20)

As shown in FIGS. 1 and 2, the image inspecting apparatus 20 includes a processor 21, a memory 22, a reader 23, a conveyor 24, and a communicator 29. These components are mutually connected through signal lines, such as a bus for exchanging a signal.

The processor 21 and the memory 22 include the respective similar configurations of the above-mentioned processor 11 and memory 12, respectively. This processor 21 performs image adjustment, image inspection, and the like of the image forming system 1 by cooperating with the processor 11 of the image forming apparatus 10. The conveyor 24 includes a conveyance path 241, a plurality of conveying rollers disposed on this conveyance path 241, and a drive motor (not shown) that drives these conveying rollers. The conveyance path 241 is connected with the conveyance path 142 disposed on the upstream side, receives a sheet S having been subjected to image formation in the image forming apparatus 10, and sends the sheet S to the post processing apparatus 30 disposed on the downstream side.

(Processor 21, Memory 22)

The processor 21 performs color adjustment and image position adjustment by using image data (hereinafter, referred to as "read image data") obtained by reading an image on a sheet S by the reader 23. Moreover, the processor 21 functions as an image analyzer 210 and performs image analysis, such as "color determination", "image position determination", and "abnormality determination" on the basis of the read image data.

The image analyzer 210 includes an edge extractor 211 and a white background extractor 212, performs analysis that determines abnormalities using a threshold value for read image data, and creates an analysis result. The edge extractor 211 detects an edge of read image data by using well-known techniques. Here, the "edge" means, for example, a boundary region in which a difference in density (or brightness value) between adjacent pixels is larger by a predetermined value or more. In the boundary region, a dark side or low side in density can be determined as an edge. For example, it is possible to calculate by performing convolution arithmetic operation for each pixel (and its peripheral pixels) of read image data by using a filter of a one-dimensional or two-dimensional predetermined size. The edge may be determined in both a main scanning direction and a sub-scanning direction. Moreover, in the case of having determined an edge, fattening processing may be performed for the inside of the edge (side where the image density is high, or the pixel value of RGB is low). That is, not only pixels on the boundary of an edge, but also several pixels located on the inside continuing to the pixels on the boundary of the edge are determined as the edge.

Moreover, the white background extractor 212 extracts a white background region from the read image data with well-known techniques. In concrete terms, in the case where the RGB pixel values of each pixel of the read image data are a predetermined value (bright) or more, the white background extractor 212 determines that the pixel is included in a white background. Moreover, the white background extractor 212 may extract a white region from printing data corresponding to the read image data. In the case where the CMYK pixel value of each pixel of printing data is a predetermined value (density is low) or less, the white background extractor 212 determines that the pixel is included in a white background.

The memory 22 memorizes image data of a color chart in which a plurality of color patches for various kinds of evaluation are arranged and image data of an inspection chart in which lattice images for position deviation detection and register mark images.

The image analyzer 210 analyzes, as "color determination", the color data of each color patch from read image data obtained by reading a sheet S on which a color chart image has been formed by the image forming apparatus 10 and sends result data to the image forming apparatus 10. The image forming apparatus 10 performs the adjustment of LUT of a color conversion (conversion from printing data to CMYK signals of the writer 131), gamma correction, screen correction, and the adjustment of density balance, or the adjustment of image formation condition of the image former 13.

The image analyzer 210 analyzes, as "image position determination", the position of each register mark from read image data obtained by reading a sheet S on which an inspection chart image has been formed by the image forming apparatus 10 and sends result data to the image forming apparatus 10. The image forming apparatus 10 adjusts the parameters of two-dimensional position correction of a skew, a shift, etc. from result data.

The image analyzer 210 performs, as "abnormality determination", abnormality determination from read image data obtained by reading a sheet S on which an image of normal image data has been formed by the image forming apparatus 10. The abnormality determination determines the abnormality of each pixel, for example, using a threshold value calculated by using a threshold value calculating method. This threshold value calculating method includes a plurality of threshold value calculating methods. In the case where the number of pixels included in a region for calculating a threshold value of a first threshold value calculating method is a predetermined value or more, first threshold value calculating method is applied, and in the case where the number of pixels is less than the predetermined value, the threshold value calculating method is switched to other threshold value calculating methods. The selection technique of this threshold value calculating method and the details with regard to the abnormality determination by a calculated threshold value are mentioned later (the below-mentioned FIG. 3 and the like).

(Reader 23)

The reader 23 is disposed on the conveyance path 241 and reads an image on a sheet S that has been subjected to image formation the image forming apparatus 10 and conveyed. In this connection, so as to be able to read both surfaces simultaneously (one pass), the same reader may be disposed also below the conveyance path 241. Alternatively, a conveyance path similar to the ADU conveyance path 143 of the image forming apparatus 10 is disposed such that both surfaces are read by one reader 23.

The reader 23 includes a sensor array, a lens optical system, an LED (Light Emitting Diode) light source, and a housing that store these components. The sensor array is a color line sensor in which a plurality of optical elements (for example, CCD (Charge Coupled Device)) are arranged in a line shape along a main scanning direction, and a reading region in a width direction corresponds to the full width of a sheet S. An optical system includes a plurality of mirrors and lenses. Light from the LED light source penetrates an original document glass and irradiates the surface of a sheet S that passes a reading position on the conveyance path 241. An image on this reading position is led by an optical system and is image-formed on a sensor array. The resolution of the reader 23 is 100 to hundreds dpi.

(Post Processing Apparatus 30)

The post processing apparatus 30 includes a post processor 31 and a conveyor 34 as shown in FIG. 1. The conveyor 34 includes conveyance paths 341 and 343, a plurality of conveying rollers disposed on these conveyance paths 341 and 343, s drive motor (not shown) that drives these conveying rollers, and sheet delivery trays 342 and 344. In this connection, although illustration is omitted, similarly to other apparatuses shown in FIG. 2, the post processing apparatus 30 includes a processor, a memory, and a communicator, and by cooperating with other apparatuses, the post processing apparatus 30 performs processing for a sheet S.

The conveyance path 341 is connected to the conveyance path 241 disposed on the upstream side and receives a sheet S conveyed from the image inspecting apparatus 20. The post processing apparatus 30 performs the post processing according to printing setting and, thereafter, discharge it to the sheet delivery tray 342. Moreover, the post processing apparatus 30 discharges the conveyed sheet S according to the printing setting to the sheet delivery tray 344 via the conveyance path 343. Moreover, the post processing apparatus 30 may discharge a sheet S determined as normal in the later-mentioned inspection to the sheet delivery tray 342 and discharge a sheet S determined as abnormal to the sheet delivery tray 344.

The post processor 31 performs various kinds of post-processing, such as staple processing, punch processing, and booklet formation processing. For example, the post processor 31 includes a stacker that stacks sheets and a stapler, superimposes a plurality of sheets in the stacker, and, thereafter, performs flat stitching processing by using a staple in the stapler.

(Abnormality Detection Processing)

Figure 3:
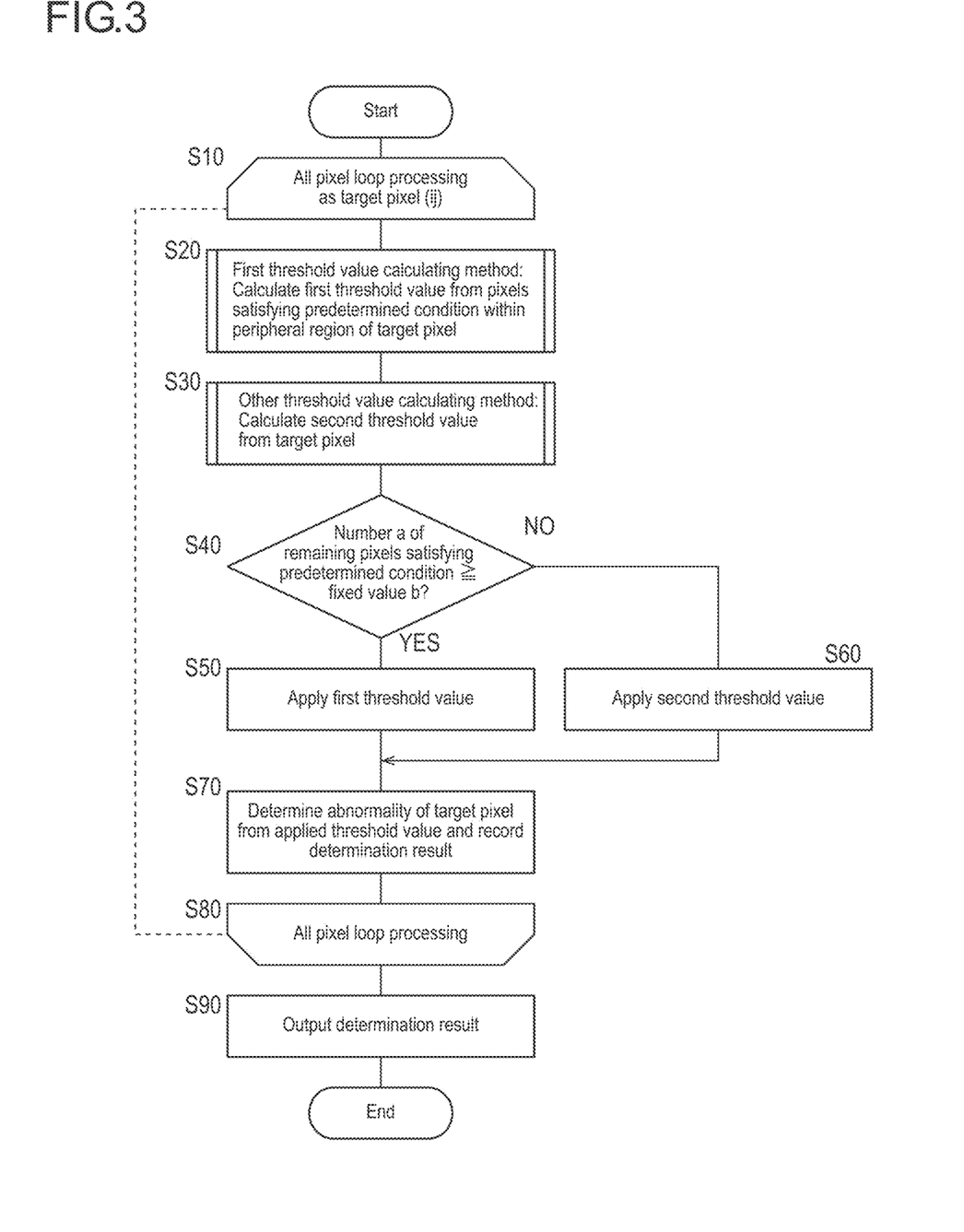
FIG. 3 is a flowchart showing abnormality detection processing executed by the image forming system.

FIG. 3 is a flowchart showing abnormality detection processing executed by the image forming system 1. The processing shown in FIG. 3 is mainly performed by the processor 21 (image analyzer 210) of the image inspecting apparatus 20.

(Step S10)

The image analyzer 210 sets each pixel of read image data to a target pixel sequentially and performs loop processing from Step S10 to Step S80 to all the pixels.

Figure 4A:
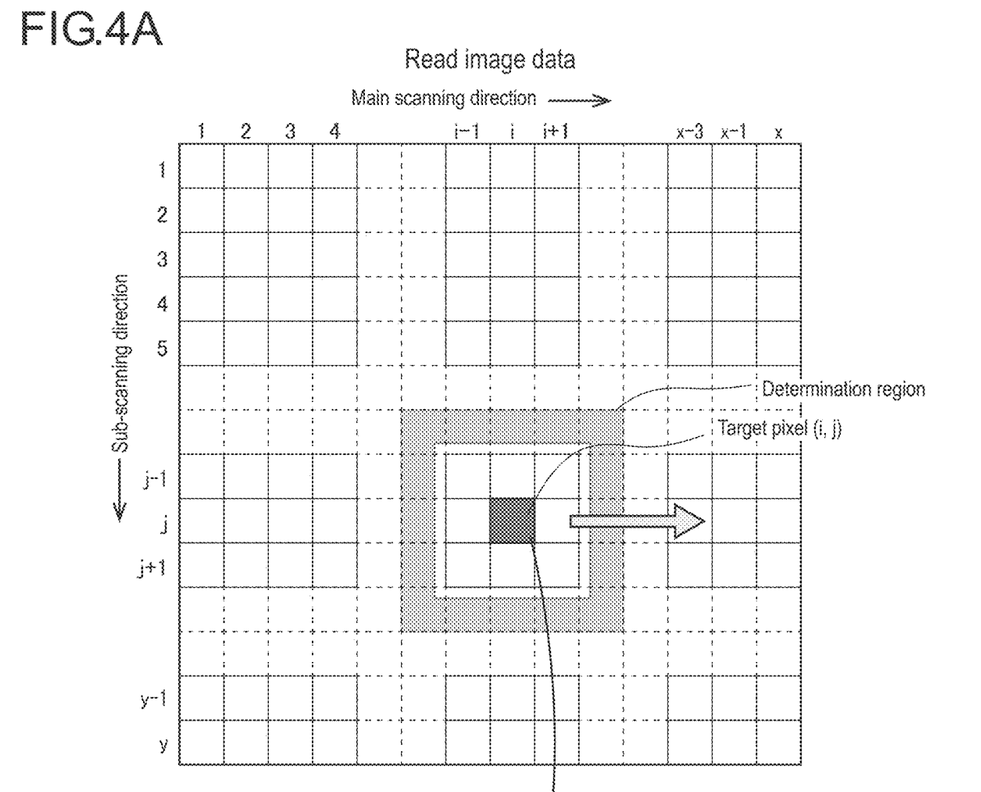
FIG. 4A is a schematic diagram for describing processing order of pixels of read image data and a target pixel.
Figure 4B:
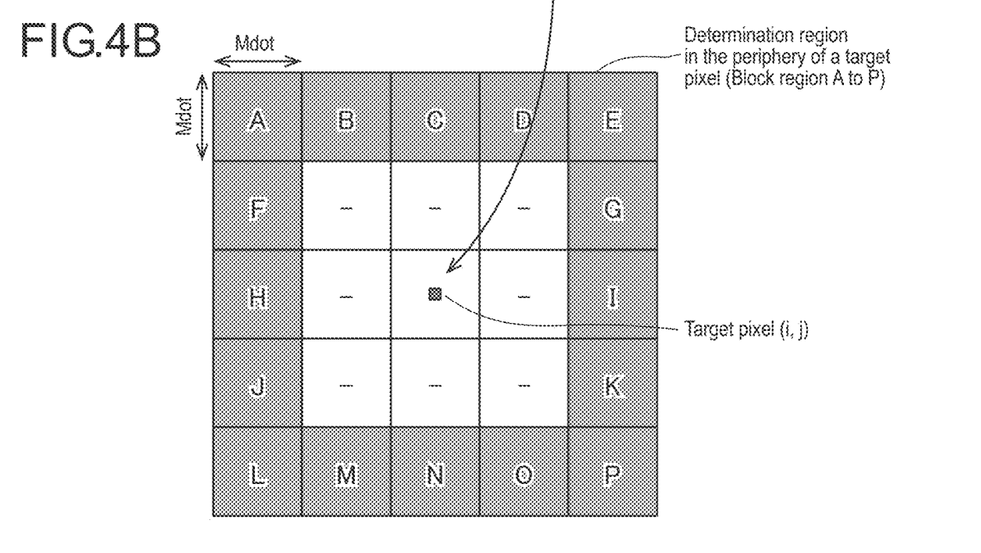
FIG. 4B is a schematic diagram for describing a target pixel and its peripheral pixels.

FIGS. 4A and 4B are schematic diagrams for describing the processing order of pixels of read image data and a target pixel. As shown in FIG. 4A, in the read image data corresponding to one sheet, x pieces of pixels are lined in the main scanning direction, and y pieces of pixels are lined in the sub-scanning direction. The number of all the pixels (x multiplied by y pieces) corresponds to a size of one sheet of a sheet S. For example, in the case where a sheet is an A3 size and 100 dpi, a total number of pixels becomes about 2 M pixels, and in the case where a sheet is an A3 size and 400 dpi, a total number of pixels becomes about 30 M pixels. For example, the sub-scanning direction corresponds to the transport direction of a sheet S in the conveyance path 241, and the main scanning direction orthogonal to the sub-scanning direction corresponds to the width direction of the sheet S. In the loop processing, while shifting a target pixel (i, j) one pixel by one pixel in order from the origin (1, 1), loop determination is performed up to the final lower right coordinate (x, y).

(Step S20)

Figure 5:
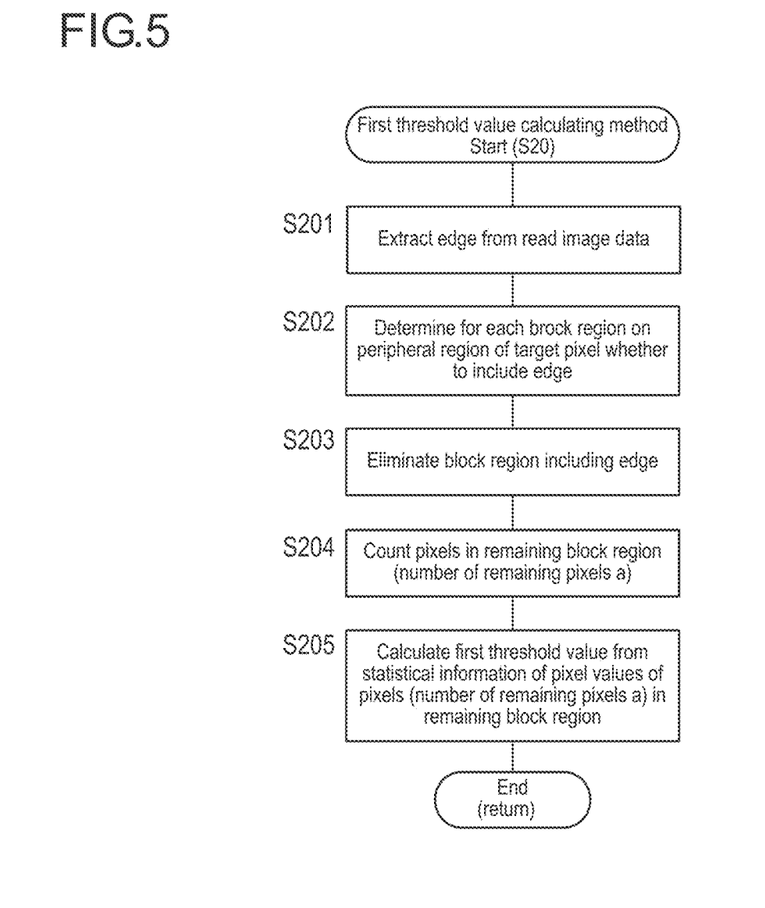
FIG. 5 is a subroutine flowchart of the first threshold value calculating method (Step S20).

The image analyzer 210 calculates a first threshold value by a first threshold value extracting method from pixels that satisfy a predetermined condition among a determination region around a target pixel, i.e., from pixels included in a region for calculating a threshold value. In other words, those pixels in which pixels that do not satisfy a predetermined condition, are removed from pixels that constitute a determination region around a target pixel, become "pixels included in a region for calculating a threshold value". Alternatively, the "pixels" can be said also as pixels included in "a region in which an edge region is removed from a peripheral region". The target pixel itself is not included in this peripheral region (excluded). FIG. 5 is a subroutine flowchart of Step S20.

Herein, as pixels that satisfy a predetermined condition among the peripheral determination region of a target pixel, i.e., as "pixels included in a region for calculating a threshold value", there are the following four conditions, and any one of them may be adopted.

(Condition 1) Pixels that determine whether a determination region includes an edge in units of a block region and constitute a block region that does not include an edge:

(Condition 2) Pixels that determine whether a determination region constitutes an edge by in units of a pixel and does not constitute edge:

(Condition 3) Pixels that determine whether a determination region includes a white region in units of a block region and does not include a white region;

(Conditions 4) Pixels that determine whether a determination region is included in a white region in unit of a pixel and is not included in a white region.

Herein, "a determination region in the periphery of a target pixel" is a region including a plurality of pixels set around the target pixel except the target pixel. For example, the region is a region surrounding a target pixel. The term "block region" is one that is separated this surrounding peripheral region into a plurality of regions, and each region includes a plurality of pixels. Moreover, in the conditions 1 and 2, the edge extractor 211 extracts an edge, and in the conditions 3 and 4, the white background extractor 212 extracts a white region. In the following embodiment, description is given to a case where the condition 1 is applied.

(Step S201)

The edge extractor 211 extracts an edge from the read image data. For example, both edges of an edge in a main scanning direction and an edge in a sub-scanning direction are extracted. In this connection, this edge extraction processing may be performed beforehand for all the pixel of the read image data before the loop processing of Step S10.

(Step S202)

The image analyzer 210 determines whether each block region in a peripheral region of a target pixel includes an edge or not. FIG. 4B is a diagram in which a determination region in a peripheral region of a target pixel (i, j) is expanded among FIG. 4A. The determination region is set in the form of a doughnut surrounding a target pixel in the peripheral region of the target pixel (i, j), divided into 16 regions, and set into block regions A to P. That is, the sum total of all the block region A to P is equal to the determination region. Each of the block regions is the same size, and the block regions form a square of M×M (M is an integer greater than or equal to 2). The size of M is, for example, 8 dots (M=8 dots). The block regions are not provided in regions adjacent to the target pixel (i, j), disposed at positions separated by a predetermined distance from the target pixel (i, j), and arranged in the form of an annular. In an example shown in FIG. 4B, block regions A-P are arranged inside a region with a size of 5M×5M centered on the target pixel (i, j). Moreover, in the region with the size of 5M×5M, a region with a size of 3M×3M centered on the target pixel (i, j) is made a blank region in which block regions are not disposed. The shape and size of each of the determination region, block region, and blank region can be set appropriately depending on the type of abnormality to be detected.

In the present embodiment, since abnormality due to so-called firefly (changed to a white void) is made a target to be detected, such a determination region has been set up. The term "firefly" is a phenomenon in which an image after transferring becomes white in the form of a circle (that is, an image density become thin or low). This phenomenon "firefly" is caused in such a way that carrier particles in a developing unit 133 adhere to an intermediate transfer belt 134 via a photoconductor drum 132, the carrier particles become foreign substances at a time of secondary transferring, and then, adhesion between a sheet S and the intermediate transfer belt 134 becomes insufficient in the vicinity of the carrier particles. The phenomenon "firefly" tends to stand out in a so-called halftone image having a uniform intermediate image density. The form and size of the blank region are made to correspond to this firefly phenomenon, and in the case where a target pixel is located at the center of a firefly, the target pixel is kept from being subject to an influence of a firefly. Moreover, the size of each of the determination region and the block region is set up in consideration of accuracy and a processing speed.

Figure 6:
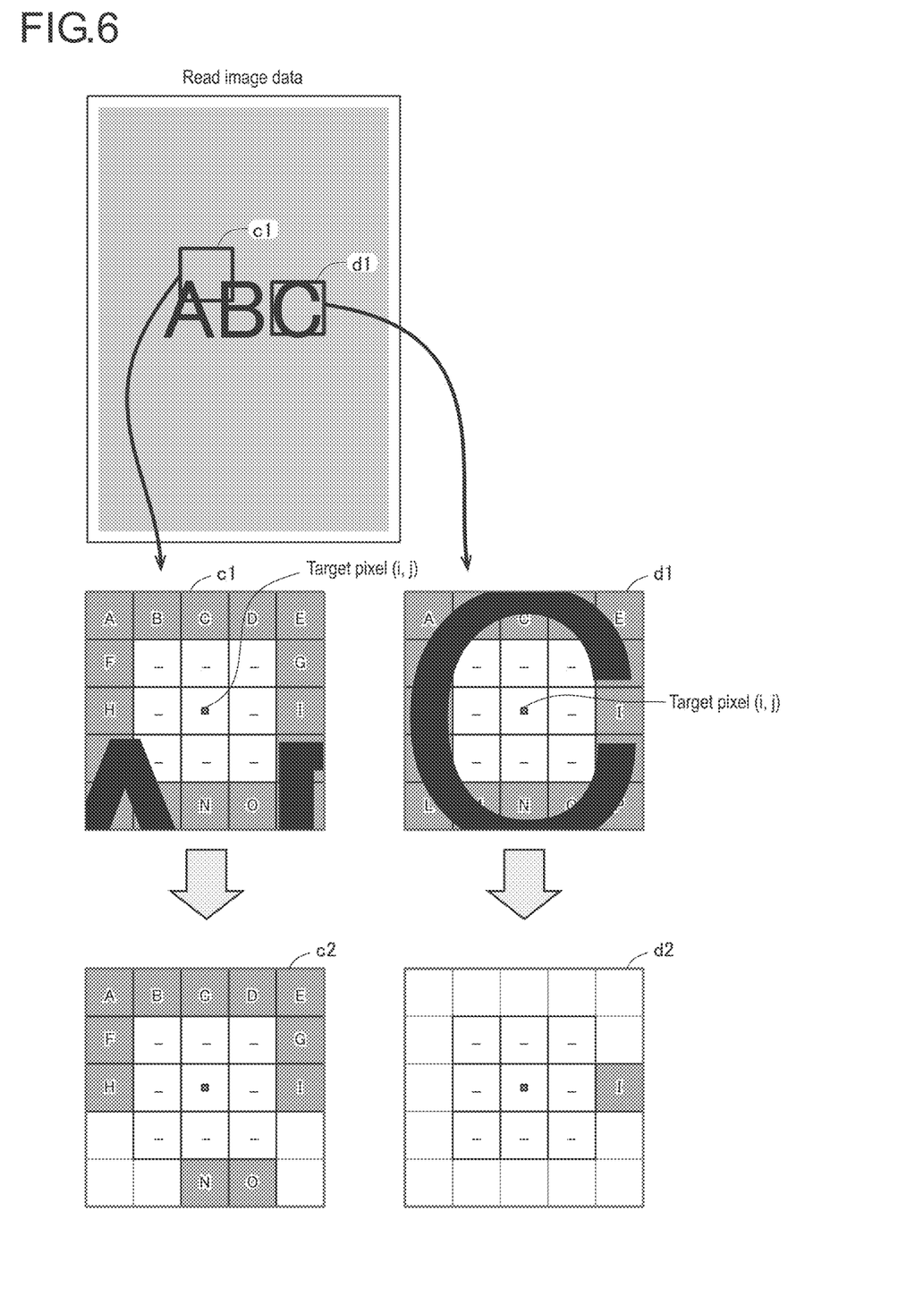
FIG. 6 is a schematic diagram for describing processing to eliminate a block region including an edge from a region for calculating a threshold value.

FIG. 6 is a schematic diagram for describing processing that eliminates a block region including an edge from a region for calculating a threshold value. In FIG. 6, each of determination regions c1 and d1 is set around a target pixel, and this setting corresponds to FIG. 4B. As shown in FIG. 6, the read image data is read out from a sheet S in which the characters of A, B, and C are drawn at the center on the whole surface of the sheet with a half-ton image mode.

(Step S203)

The image analyzer 210 eliminates a block region including an edge. In a determination region c1 in FIG. 6, since block regions J, K, L, M, and P include an edge, these block regions are eliminated. As shown in the determination region c2, 11 block regions A to I, N, and O remain. In the determination region d2 in FIG. 6, since block regions other than a block region I include an edge, after these block regions have been eliminated, only one block region I remains. This block region having remained corresponds to a region for calculating a threshold value. The number of pixels in this block region having remained corresponds to the number of pixels included in a region for calculating a threshold value.

(Step S204)

The image analyzer 210 counts the number of pixels in the block region having remained. For example, in the determination region c2, the number of block regions having remained is n, and in the determination region d2, the number of block regions having remained is 1. The number of pixels can be obtained by multiplying the number of these blocks with the number of pixels per block. For example, in the case where the number of blocks is 11 and the number of pixels per one block is 64 (M=8 dots), the number "a" of remaining pixels becomes 704.

(Step S205)

The image analyzer 210 calculates a first threshold value from the statistical information of a pixel value of pixels of a block region having remained. For example, an average and standard deviation (σ) are calculated from the pixel values of 704 pixels of the number of remaining pixels "a", and an "average value +3σ" and an "average value −3σ" are made a first threshold value. In this connection, as the first threshold value, a value acquired by multiplying an average value by a fixed coefficient (for example, 0.8 times or 1.2 times) may be used. The processing of the subroutine flowchart is ended by the above, and the processing returns to the main processing shown in FIG. 3 (end (return)).

(Step S30)

Figure 7:
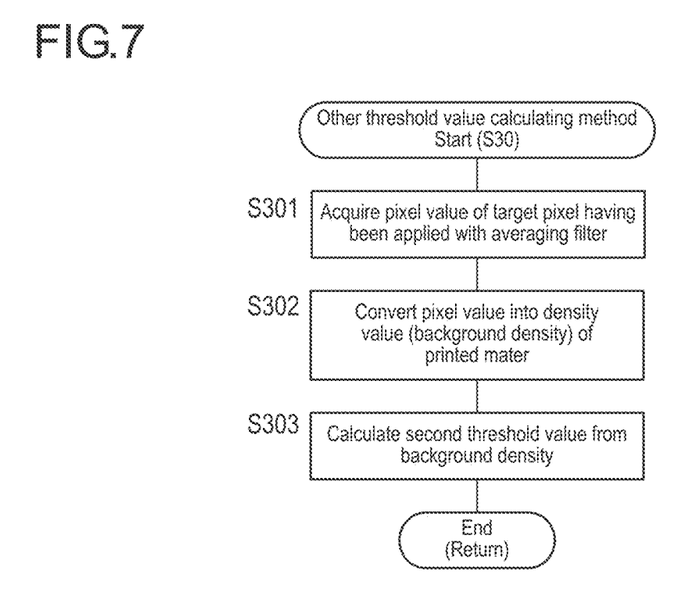
FIG. 7 is a subroutine flowchart of other threshold value calculating method (Step S30).

The image analyzer 210 calculates a second threshold value from the target pixel by the other threshold value extracting method. FIG. 7 is a subroutine flowchart of Step S30.

(Step S301)

The image analyzer 210 performs averaging processing for the read image data by using an averaging filter of a predetermined size (configured by from several pixels to hundreds of pixels) and acquires the pixel value of the target pixel after the averaging processing. For example, a two-dimensional averaging filter with a size of 24×24 dots may be used. In this connection, this averaging processing may be performed for all the pixels of the read image data beforehand before loop processing in Step S10. Moreover, as "the other modified example", instead of obtaining "the pixel value of a target pixel after the averaging processing", a pixel value may be calculated from the printing data (the original image data of the read sheet S). In concrete terms, each of the pixels of the printing data (CMYK data) is subjected to RGB conversion, and all the pixels are subjected to the averaging processing. Successively, a pixel value after the averaging processing of the printing data of the position corresponding to the target pixel in the read image data is used instead of the above-described "the pixel value of the target pixel after the averaging processing".

(Step S302)

The pixel value (after the averaging processing) acquired at Step S301 is converted into the density value of a printed matter. The conversion of this density value is performed by converting the pixel value of RGB of the read image data into a density value. Hereinafter, this density conversion value is also called a background density. Moreover, in the case of applying the other modified example using the above-described printing data, similarly, the background density having been subjected to the density conversion on the basis of the printing data.

(Step S303)

The second threshold value is calculated from the background density obtained at Step S302 by using a conversion formula described below.

Figure 8:
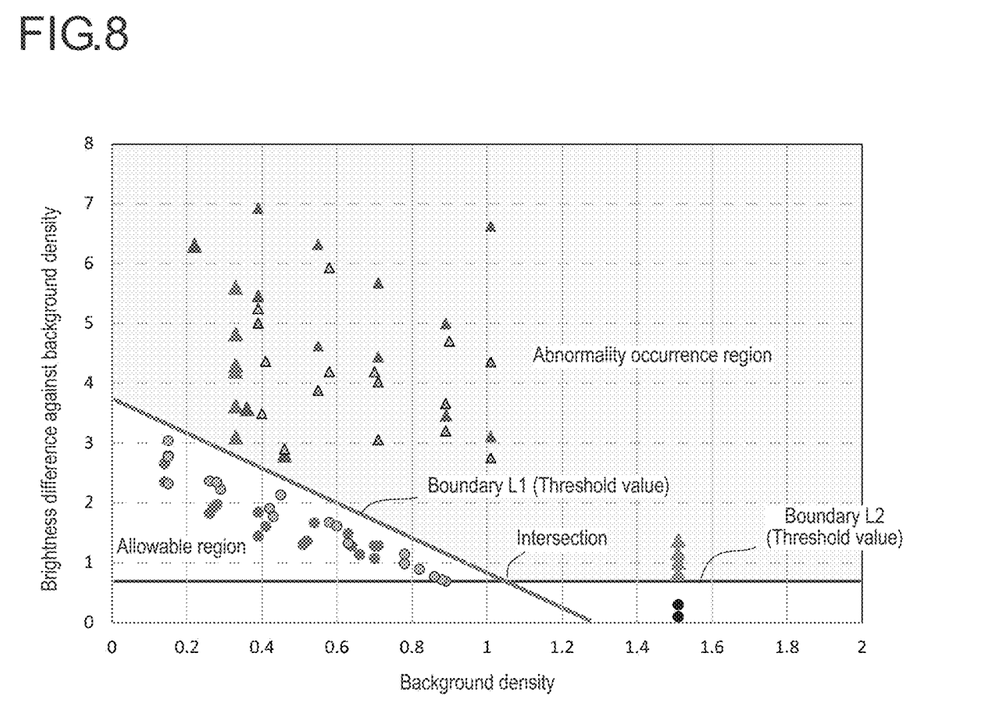
FIG. 8 is a diagram for describing a correspondence relation between a background density and a threshold value (brightness).

FIG. 8 is a diagram for describing a correspondence relation between a background density and a threshold value (brightness). A whitened void due to the firefly phenomenon is different in conspicuity with visual inspection on the basis of an image density of a background. FIG. 8 is a diagram in which a horizontal axis represents a background density and a vertical axis represents a brightness difference. This brightness difference is a difference between a brightness value of a background density and a brightness value of a central portion of a firefly becoming a target. In FIG. 8, a hatched portion located above the boundary L1 and the boundary L2 is an abnormality occurrence region and has been made a NG determination (not allowable) by an observer's subjective judgment. On the other hand, a portion located below the boundary L1 or the boundary L2 has been determined as OK. In a region where a background density is smaller than an intersection, the boundary L1 is used, alternatively, in a large region where a background density is larger than an intersection, the boundary L2 is used. The conversion formula created by using the boundaries L1 and L2 is represented by, for example, a linear function (in this connection, the boundary L2 is a fixed value in which an inclination is zero) and is memorized in the memory 22.

In the case where a background density obtained at Step S302 is, for example, 0.6, a brightness difference on the boundary L1 becomes 2, and this brightness difference of 2 will serve as a second threshold value. In this connection, in the second threshold value, the brightness value may be converted into a density value. The processing of the subroutine flowchart described in above has been ended, and the subroutine flowchart returns to the main processing shown in FIG. 3 (end (return)).

(Step S40)

The image analyzer 210 determines whether the number of pixels satisfying a predetermined condition among pixels included in a determination region is greater than or equal to a fixed value b. This number of pixels is the number of remaining pixels "a" calculated at Step 204. Here, as the fixed value "b", 8 pixels or more among 16 blocks included in the determination region, that is, 512 pixels as the number of pixels is made the fixed value "b". In the case where the number of remaining pixels "a" is this fixed value "b" or more (Yes), the processing is made to advance to Step S50, and in the case where the number of remaining pixels "a" is less than the fixed value "b" (No), the processing is made to advance to Step S60. In this connection, as the fixed value "b", without being limited to this mode, in the case of using statistical information, the value "b" may be set appropriately depending on the number of pixels (a size of a population) of the determination region, allowable errors, and a reliability level.

(Step S50)

The first threshold value calculated at Step S20 is applied.

(Step S60)

The second threshold value calculated at Step S30 is applied.

(Step S70)

By using the threshold value applied at Step S20 or S30, the image analyzer 210 determines the abnormality of the target pixel and creates an analysis result. In the case where the abnormality has been determined on the basis of the analysis result, this determination is recorded in the memory 22. For example, in the case of the first threshold value calculated from the statistical information of peripheral pixels of a target pixel, and in the case where the pixel value of the target pixel exceeds "an average value +3σ, or in the case where the pixel value of the target pixel is less than "an average value −3σ, it is determined that the target pixel is abnormal. In the case of the second threshold value calculated from the pixel value of the target pixel after the averaging processing, and in the case where a difference (absolute value) between the pixel value of the target pixel and the pixel value of the target pixel after the averaging processing exceeds the second threshold value, it is determined that the target pixel is abnormal.

(Step S80)

The image analyzer 210 repeats the processing of from Step S20 to the step S70 for the number of all the pixels while moving a target pixel (i, j) by the loop processing. After having ended the processing for all the pixels, the processing is made to advance to Step S90. In this connection, in the case where the abnormality determination has been made even once at Step S70, the loop processing is interrupted, the processing may be made to advance to Step S90.

(Step S90)

The processor 21 of the image inspecting apparatus 20 outputs a determination result. For example, in the case where there is a pixel having been determined as abnormal, the image inspecting apparatus 20 outputs a determination result to the image forming apparatus 10. Successively, the image forming apparatus 10 having received this determination result, displays the determination result on the operation display 15.

Moreover, the image inspecting apparatus 20 may be made to output the determination result also to the post processing apparatus 30. The post processing apparatus 30 delivers the sheet S having been determined as abnormal to a sheet delivery tray 344 different from a sheet delivery tray 342 for sheets having been determined as normal and enables the sheet S to be distinguished from other sheets S.

As describe in the above, in the present embodiment, the image analyzer 210 makes each pixel constituting read image data a target pixel sequentially and performs abnormality determination for this target pixel by using a threshold value calculated by using a threshold value calculating method. Moreover, the threshold value calculating method includes a plurality of threshold value calculating methods, and the first threshold value calculating method is switched to the other threshold value calculating method according to the number of pixels included in a region for calculating a threshold value in the first threshold value calculating method. By doing in this way, it becomes possible to detect abnormalities appropriately.

In the present embodiment, as described in FIG. 6, among pixels included in a determination region in the periphery of a target pixel, pixels included in a block region in which an edge is included, are eliminated. This is because, if a pixel of an edge is used for calculating the first threshold value, the pixel becomes a noise so that a correct threshold value, i.e., a range (an average value ±3σ) of a correct background density cannot be calculated. On the other hand, in the case where the number of remaining pixels becomes too small by eliminating pixels included in a block region including an edge like the determination region d1 shown in FIG. 6, as another problem, since a sample size is too small, a range of a correct background density with a high reliability level cannot be calculated. Therefore, the first threshold value calculating method that calculates a threshold value on the basis of statistics is switched to the other threshold value calculating methods that do not use a statistics technique and do not receive an influence of a sample size. By doing in this way, since a suitable t threshold value is calculated always, abnormalities can be appropriately detected.

The above-described configuration of each of the image inspecting apparatus 20 and the image forming system 1 equipped with the image inspecting apparatus 20 is merely described for describing the features of the above-mentioned embodiments. Accordingly, without being limited to the above-mentioned configuration, various modification can be made within the scope of patent claims. Moreover, configurations equipped by the image inspecting apparatus 20 and the image forming system 1 are not eliminated.

For example, in the above-mentioned embodiments, although an example of a configuration (in-line) in which the image inspecting apparatus 20 and its reader 23 are incorporated in the image forming system 1, these apparatuses may be made in an independent constitution. In concrete terms, the image inspecting apparatus 20 is configured by an independent scanner (reader) and an independent PC (personal computer). Moreover, further, the image inspecting apparatus 20 may be configured only by an arithmetic processor, such as a PC without including a reader. In this case, read image data is acquired from an external scanner via a network by the communicator 29 (function as an "acquirer"). In these cases, an image is formed on a sheet S by the image forming apparatus 10, read image data is obtained by moving an independent scanner on the image on the sheet S with a hand carry technique by a user, and then the above-mentioned abnormality detection processing is performed on the basis of the read image data. Moreover, in that case, the user may manually make correspondence between printing data used by the image forming apparatus 10 and the read image data or may automatically make the correspondence by reading marks and numbers such as barcodes on the sheet S.

Moreover, in the processing shown in FIG. 5, like the above-mentioned condition 1, pixels constituting a block region including an edge are eliminated from pixels included in a region for calculating a threshold value, any of the conditions 2 to 4 may be applied. Moreover, these conditions may be combined, and determination may be made on the basis of the logical sum or logical product of the plurality of conditions. For example, the conditions 1 (edge elimination) that determines in units of a block region and the conditions 3 (white-region elimination). Namely, pixels that satisfy both of the condition 1 and the condition 3 or one of them are used for calculating the first threshold value by the first threshold value calculating method as pixels included in a region for calculating a threshold value. Similarly, the conditions 2 and 4 that perform the condition determination in units of a pixel may be combined.

A unit and method for performing various kinds of processing in the image forming system 1 and the image inspecting apparatus 20 according to the above-mentioned embodiments can be realized by any one of hardware circuitry for exclusive use or of programed computers. The above-described program may be provided, for example, by a computer-readable recording medium, such as a USB memory and a DVD (Digital Versatile Disc)-ROM or may be provided on-line through networks, such as an internet. In this case, a program recorded in a computer-readable recording medium is usually transferred to a memory, such as a hard disk, and is memorized. Moreover, the above-mentioned program may be provided as independent application software or may be incorporated in the software of an apparatus as one function of the apparatus.

Although embodiments of the present invention have been described and illustrated in detail, the disclosed embodiments are made for purpose of illustration and example only and not limitation. The scope of the present invention should be interpreted by terms of the appended claims.

What is claimed is:

1. An image inspecting apparatus, comprising:
a hardware processor that is configured to:
acquire read image data generated by reading an image formed on a recording material by an image forming apparatus, and
perform analysis to determine abnormality for the read image data by using a threshold value and create an analysis result;
wherein the hardware processor is configured to set each of pixels constituting the read image data as a target pixel sequentially and perform determination of abnormality for the target pixel by using the threshold value calculated by using a threshold value calculating method selected from among a plurality of threshold value calculating methods including a first threshold value calculating method and another threshold value calculating method, and wherein any one of the threshold value calculating methods is selected from among the plurality of threshold value calculating methods, and the first threshold value calculating method is switched to the other threshold value calculating method correspondingly to a number of pixels included in a region for calculating a threshold value in the first threshold value calculating method.

2. The image inspecting apparatus according to claim 1, wherein in a region for calculating a threshold value in the first threshold value calculating method, a plurality of pixels in a peripheral region of the target pixel is included other than the target pixel, wherein in the first threshold value calculating method, a threshold value is calculated from respective pixel values of the plurality of pixels in the region for calculating a threshold value, and wherein in the other threshold value calculating method, a threshold value is calculated from a pixel value of the target pixel.

3. The image inspecting apparatus according to claim 2, wherein in the first threshold value calculating method, a threshold value is calculated from statistical information of a plurality of pixels, and wherein in the other threshold value calculating method, a threshold value is calculated from a density conversion value on a recording material obtained from a pixel value of the target pixel.

4. The image inspecting apparatus according to claim 1, wherein in a region for calculating a threshold value in the first threshold value calculating method, a plurality of block regions constituted by a plurality of respective pixels on a peripheral region of the target pixel, are included.

5. The image inspecting apparatus according to claim 4, wherein the hardware processor is configured to determine for each of the plurality of block regions whether a predetermined condition is satisfied and to switch to the other threshold value calculating method correspondingly to a number of pixels constituting block regions satisfying the predetermined condition from among the plurality of block regions.

6. The image inspecting apparatus according to claim 5, wherein the hardware processor is further configured to: extract an edge of an image from the read image data, and determine for each of the plurality of block regions, as the predetermined condition, whether an extracted edge is included in the block region, and switch to the other threshold value calculating method correspondingly to a number of pixels constituting block regions not including the edge from among the plurality of block regions, wherein the block regions not including the edge are determined to satisfy the predetermined condition.

7. The image inspecting apparatus according to claim 5, wherein the hardware processor is further configured to:

extract a white background region from the read image data or printing data having been used for image formation on the recording material in the image forming apparatus, and determine for each of the plurality of block regions, as the predetermined condition, whether the extracted white background region is included in the block region, and switch to the other threshold value calculating method correspondingly to a number of pixels constituting block regions not including the white background region from among the plurality of block regions, wherein the block regions not including the white background are determined to satisfy the predetermined condition.

8. The image inspecting apparatus according to claim 1, wherein the hardware processor is configured to determine for each of pixels included in a peripheral region of the target pixel whether a predetermined condition is satisfied, and to switch to the other threshold value calculating method correspondingly to a number of pixels satisfying the predetermined condition.

9. The image inspecting apparatus according to claim 8, wherein the hardware processor is further configured to:

extract an edge of an image from the read image data, and determine, for each of pixels included in the peripheral region, as the predetermined condition, whether the pixel constitutes the extracted edge, and switch to the other threshold value calculating method correspondingly to a number of pixels not constituting the edge, wherein the pixels not constituting the edge satisfy the predetermined condition.

10. The image inspecting apparatus according to claim 8, wherein the hardware processor is further configured to:

extract a white background region from the read image data or printing data having been used for image formation on the recording material in the image forming apparatus, and determine, for each of pixels included in the peripheral region, as the predetermined condition, whether the pixel is included in the white background region, and switch to the other threshold value calculating method correspondingly to a number of pixels not included in the white background region, wherein the pixels not included in the white background region satisfy the predetermined condition.

11. The image inspecting apparatus according to claim 1, further comprising:

a reader that reads an image formed on a recording material in an image forming apparatus and generates the read image data.

12. An image forming system, comprising:

an image forming apparatus that performs image formation on a recording material on a basis of printing data; and the image inspecting apparatus according to claim 1 that analyzes the image on the recording material formed in the image forming apparatus.

* * * * *